(No Model.) 3 Sheets—Sheet 3.
E. K. COAS.
MACHINE FOR MAKING TUBES.
No. 344,350. Patented June 29, 1886.
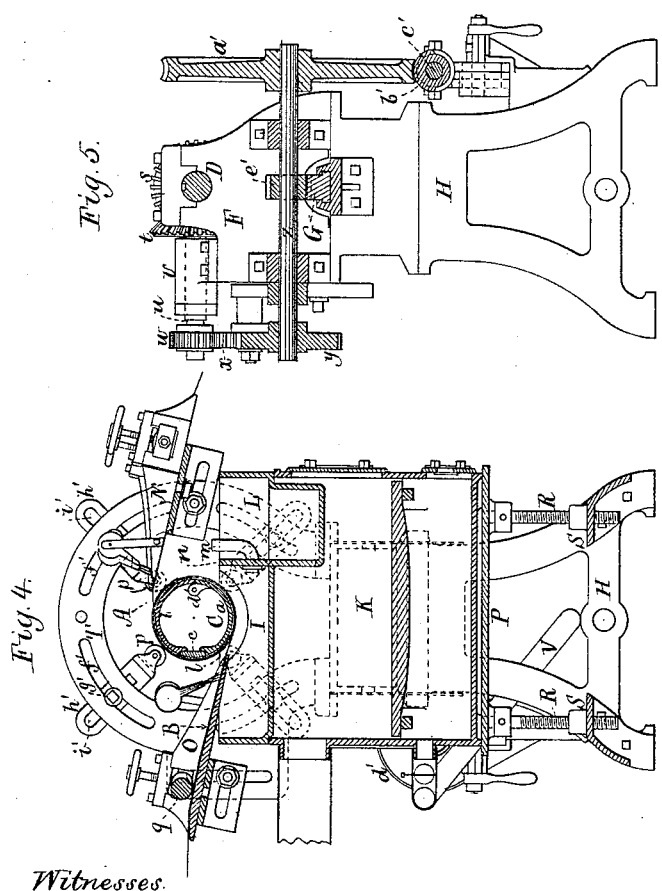
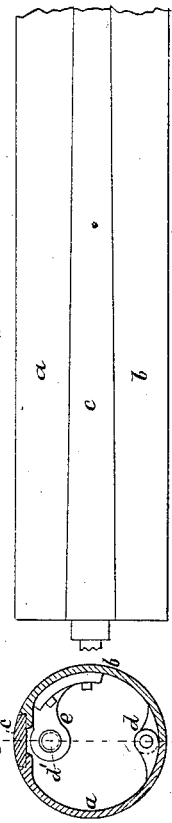
Witnesses
S. N. Piper
R. B. Torrey
Inventor,
Edward K. Coas.
by R. H. Eddy atty.

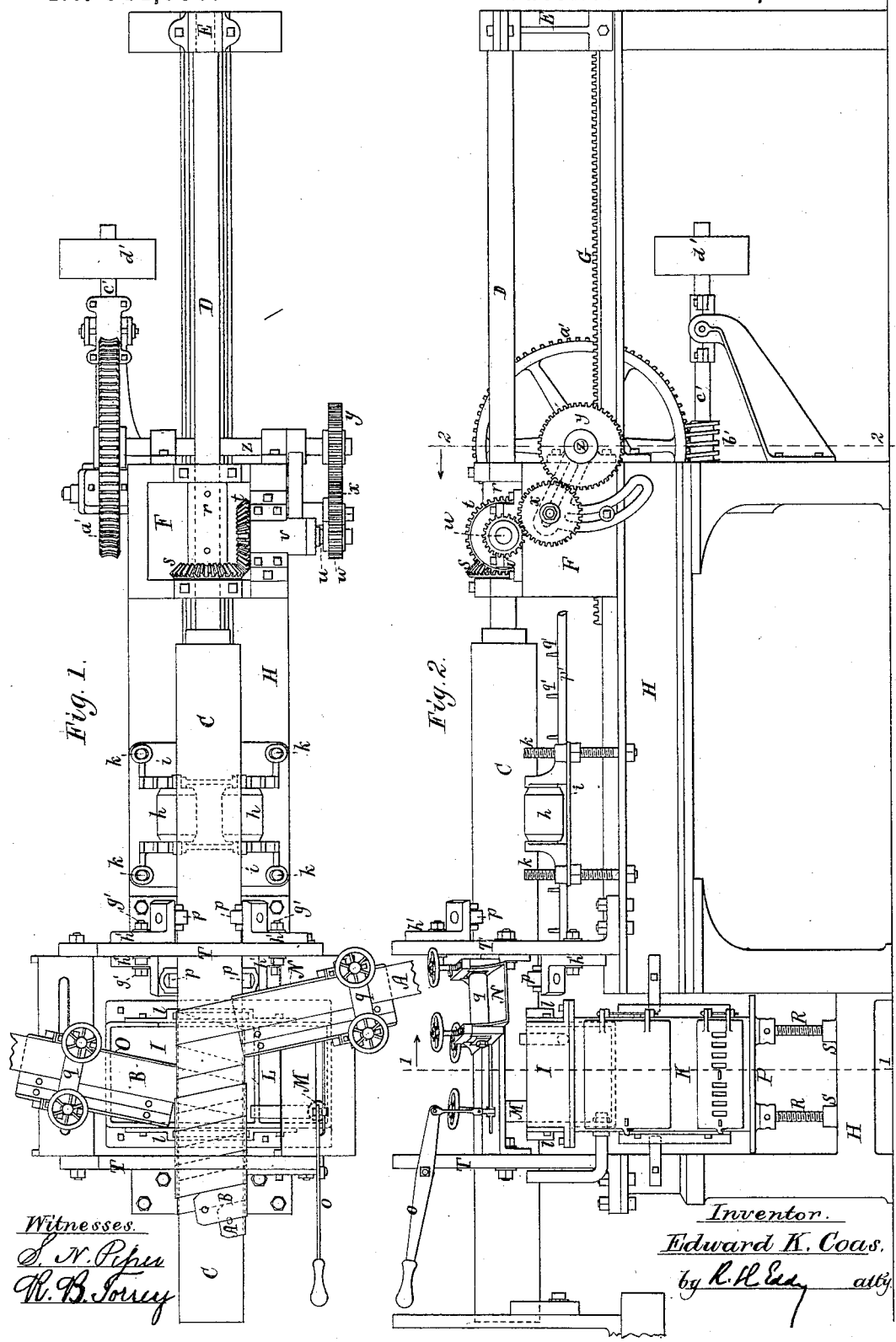

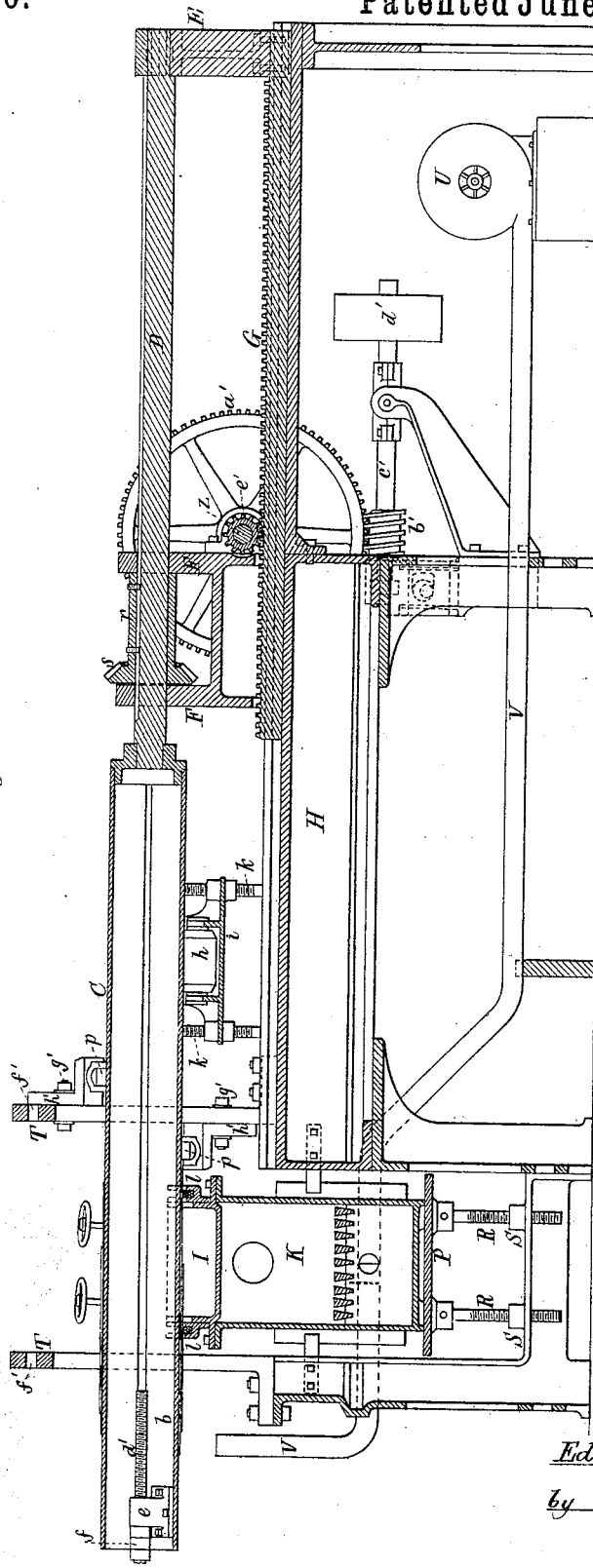

UNITED STATES PATENT OFFICE.

EDWARD KING COAS, OF GLOUCESTER, MASSACHUSETTS.

MACHINE FOR MAKING TUBES.

SPECIFICATION forming part of Letters Patent No. 344,350, dated June 29, 1886.

Application filed November 13, 1885. Serial No. 182,660. (No model.)

*To all whom it may concern:*

Be it known that I, EDWARD KING COAS, of Gloucester, in the county of Essex, of the Commonwealth of Massachusetts, have invented a new and useful Improvement in Machines for Making Tubes; and I do hereby declare the same to be described in the following specification and represented in the accompanying drawings, of which—

Figure 1 is a top view, Fig. 2 a side elevation, and Fig. 3 a longitudinal and median section, of a machine embodying my invention, the nature of which is defined in the claims hereinafter presented. Fig. 4 is a transverse section of such machine, the plane of section being through the line 1 1 of Fig. 2. Fig. 5 is another such section, it being taken on line 2 2 of said Fig. 2, and exhibiting the "head-stock" and parts adjacent thereto, to be explained. Fig. 6 is a longitudinal section, Fig. 7 a transverse section, and Fig. 8 an elevation, of part of the mandrel to be described.

The machine is to manufacture a tube from two strips of metal, one of which is coiled spirally around a mandrel, with each of the coils in contact or close contiguity with the succeeding one at their next adjacent edges, the second strip being wound in like manner and direction about the first one, but so that the joints between the coil of the first one shall be covered by the coil of the said second strip. In so winding the two strips, solder is applied to their next contiguous surfaces and between the edges of their coils, so as not only to firmly connect each coil with the next succeeding one in each strip, but also to connect the one spirally-wound strip to the other, the solder between the two constituting of itself an intermediate solid tube. In the drawings one of such strips is shown at A and the other at B, as they appear in course of being wound one upon the other and both about a mandrel, C. The said mandrel, as represented, is tubular, and at one end is fastened to a long guide-rod, D, which has bearings in a puppet, E, and a head-stock, F, which, extended over a toothed rack, G, fastened to the puppet, are supported on suitable ways, so as to be capable of rectilineal movements in a frame, H.

The mandrel is collapsible, to admit of the tube being withdrawn from it. To this end the mandrel is in three sections, *a*, *b*, and *c*, the two sections *a* and *b* being hinged to each other at their lower edges, as shown at *d*. (See Figs. 4, 6, and 7.) At their upper edges the said parts *a* and *b* are rabbeted transversely, and are tapered lengthwise to receive and support the intermediate portion, *c*, which is not only dovetailed in transverse section, but is tapering longitudinally, as represented. The said part *c* is provided with mechanism for drawing it backward a sufficient distance to allow of the sections *a* and *b* being moved toward each other far enough to enable the made tube to be readily drawn off the mandrel. This mechanism consists of a screw, *d'*, that screws through a bracket, *e*, projecting inwardly from the section *b*, such screw being journaled in an ear, *f*, extending from the section *c*. On applying a wrench or a crank to the screw and revolving it the section *c* may be drawn backward and afterward impelled forward.

The mandrel is supported by two rollers, *h*, sustained by a frame, *i*, which in turn has screws *k*, for adjusting it in altitude to fit the rollers to mandrels varying in diameter, according to the diameters of tubes to be made by the machine. The mandrel extends across a tank, I, that is situated over a furnace, K, for heating it, such tank being to hold the solder used in connecting the spirally-wound strips. The two opposite sides of the tank have segmental notches in them, to allow of the mandrel dipping a short distance into the tank, in order for the solder to reach up to and high enough upon the mandrel. Stuffing-boxes *l* are applied to the sides of the tank and against the mandrel, to prevent waste of the solder, asbestus being used for the packings of such boxes.

Aside of the tank I, and extending below it, as shown, is an auxiliary tank, L. (See Fig. 4.) A bent spout, *m*, is journaled in the partition *n*, between the tanks, at an altitude lower than either of the notches in the sides of the tank I. On turning the said tube downward, melted solder in the main tank may be discharged into the auxiliary one until the level of the mass of solder in the main tank shall be below the said notches. Were it not for the auxiliary tank and the said discharge-tube, there would be an escape of solder through the notches in removal of a made tube from the mandrel. In the place of the said discharge-tube, a simple waste-cock might be used.

To get the solder from the auxiliary back into the main tank, an ordinary lifting or forcing pump may be employed, such a pump being shown at M in Figs. 1 and 2, the handle or lever for working such pump being represented at o.

The mandrel is further supported by a set of four adjustable rollers, arranged as shown at p p, &c., in Figs. 1, 2, 3, and 4, and such mandrel has applied to its guide-rod mechanism for revolving both mandrel and guide-rod and moving them longitudinally, to cause the metallic strips to be properly wound about the said mandrel. The strips are led to the mandrel through two troughs or guides, N and O, having in each a pressure-roller, q, to rest and revolve upon the strip, such roller being provided with means of adjusting it in altitude relatively to the bottom of the guide as the thickness of the strip may require. The rod D has a spline or feather connection with the hub r of a bevel-gear, s, arranged on or with the rod, as shown in Figs. 1 and 3. This gear, disposed in the head-stock F, engages with another such gear, t, fixed on a shaft, u, journaled in a box, v, fastened on the said headstock. The shaft u carries a pinion, w, that engages with a spur-gear, y, by means of an intermediate gear, x. (See Figs. 1, 2, and 5.) The gear y is carried by a shaft, z, upon which is fixed a worm-gear, a', that engages with a worm or screw, b', fixed upon a shaft, c', provided with a driving-pulley, d', all being arranged as represented. The shaft z carries a pinion, e', that engages with the rack G, hereinbefore mentioned. On the pulley d' being revolved, not only will a slow rotary motion be imparted to the mandrel, but such mandrel will be moved in a direction lengthwise of it. The furnace K rests upon a plate, P, provided with screws R R, for adjusting it and the soldering-tanks in altitude relatively to the mandrel, such screws being shown, as in Figs. 2, 3, and 4, as screwed through bosses S S, fixed to the frame H. T T are two arched standards projecting upward from the said frame H. In one of these standards are curved slots f', through which are extended the fastening screw-bolts g', employed to secure to the standard the carriers h', that sustain the rollers p, (see Figs. 1, 2, 3, and 4,) each carrier being slotted lengthwise of it, as shown at i'. Below the mandrel is a pipe or pipes, p', provided with a series of gas-jets, q', or means of discharging from the pipe gas, such as when inflamed will heat the mandrel, in order for it, in passing through the solder, to be at a proper temperature to prevent prematurely setting the solder.

To use the machine, a person is first to fasten to the mandrel the strip A at or near its inner end, after which the mandrel is to be revolved once, it being moved endwise in the meantime, so as to cause the strip to be coiled once upon it. Next, the other strip is to be fastened, at or near its inner end, to the mandrel, and is to be arranged to lap on the first strip in a manner to cause the spiral joint between the coils of the said first strip as produced to be covered by the coils of the second strip as they are made. The outermost strip passes through the solder, and so does the innermost strip. The solder not only flows between and unites them in the course of their being coiled, but at the same time extends into the spiral joint between the coils of each, and fills it and joins each coil to that next to it. In each revolution of the mandrel it is advanced a distance sufficient to cause each coil of each strip to lie closely against the next preceding coil of such strip.

In order to reduce the temperature of the mandrel sufficiently as it may pass from the tank of solder, I make use of a blower, U, and a pipe or educt, V, extending from its case to the part of the mandrel immediately in advance of the tank. By discharging upon the portion of the mandrel and the tube encompassing it a blast of cool air, the setting of the solder will be insured.

I claim—

1. The machine, substantially as specified, composed of the mandrel provided with mechanism for supporting it, revolving it transversely, and moving it endwise, as described, the two strip-guides, and the soldering-tank and its furnace, arranged with such mandrel and to operate therewith essentially as set forth.

2. The combination of the mandrel provided with mechanism for supporting it, revolving it transversely, and moving it endwise, as described, the two strip-guards, and the soldering-tank and its furnace, with the auxiliary tank arranged with and to extend below the main tank, such tanks being furnished with a tube or educt for discharging solder from the main into the auxiliary tank, substantially and for the purposes as set forth.

3. The combination of the mandrel provided with mechanism for supporting it, revolving it transversely, and moving it endwise, as described, the two strip-guards, and the soldering-tank and its furnace, with the air-blower and its educt, arranged and to operate with the said mandrel substantially as set forth.

4. The mandrel, essentially as described, composed of the hinged and rabbeted sections a and b and the dovetailed and tapering section c, arranged as represented, and having to the latter section mechanism for moving it endwise between the others, as set forth.

5. The combination of the mandrel provided with mechanism for supporting it, revolving it transversely, and moving it endwise, as described, the two strip-guides, and the soldering-tank and its furnace, with supplementary means of heating the mandrel, and for the purposes specified.

Witnesses:     EDWARD KING COAS.
R. H. EDDY,
S. N. PIPER.